J. L. WINGATE.
Trace-Fastening for Whiffletrees.

No. 163,956.　　　　　　　　　　Patented June 1, 1875.

WITNESSES:
C. Neveuxe
A. F. Terry

INVENTOR:
J. L. Wingate
BY Munn & Co
ATTORNEYS.

UNITED STATES PATENT OFFICE.

JOHN L. WINGATE, OF MOOERS FORKS, NEW YORK.

IMPROVEMENT IN TRACE-FASTENINGS FOR WHIFFLETREES.

Specification forming part of Letters Patent No. 163,956, dated June 1, 1875; application filed August 10, 1874.

*To all whom it may concern:*

Be it known that I, JOHN L. WINGATE, of Mooers Forks, Clinton county, New York, have invented new and useful Improvements in Trace-Fastenings, of which the following is a specification:

The invention will first be fully described, and then pointed out in the claim.

Figure 1:
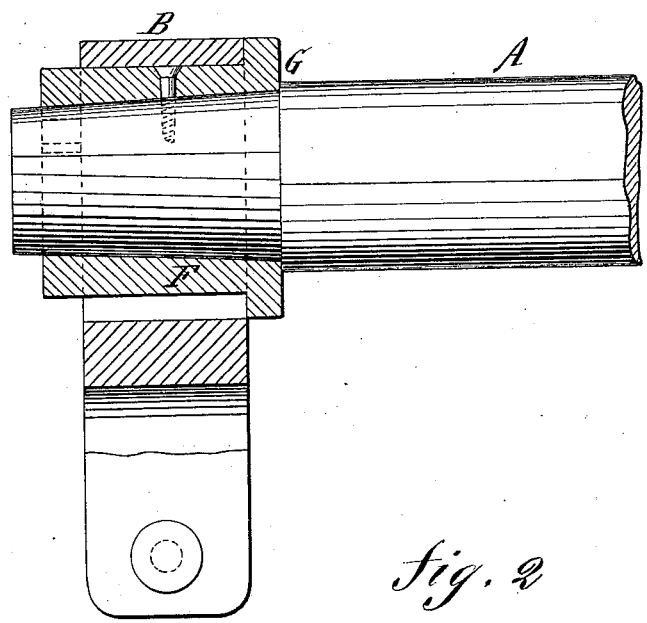
Figure 2:
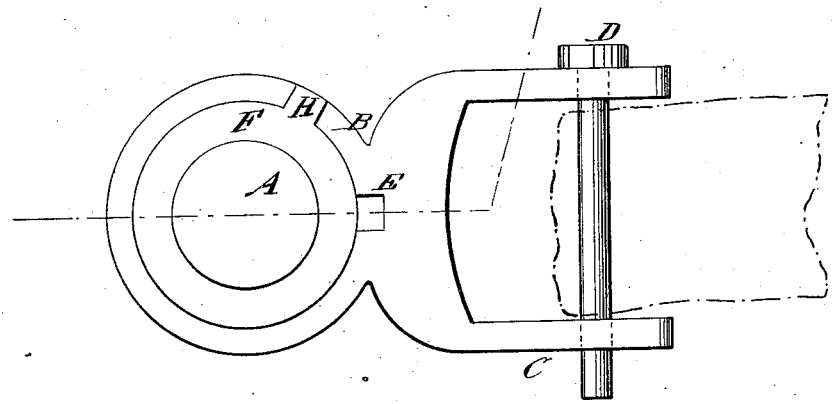

In the accompanying drawing, Figure 1 is a section of Fig. 2, taken on the line $x\ x$; and Fig. 2 is an end view.

Similar letters of reference indicate corresponding parts.

A is the whiffletree. B is the eye, to which the trace is attached by means of the clevis end C and the pin or rivet D. E is a slot or channel through the eye. F is a thimble or ferrule, which is made fast on the ends of the whiffletree. The eye B slips onto this thimble, and bears against the collar G. H is a lug on the outer end of the thimble. This lug passes through the channel E as the eye is slipped on. The space between the lug and the collar G is equal to the width of the eye.

The thimble is stationary, and after the eye is slipped onto it the slot drops down from the lug, which securely confines the eye between the lug and the collar G. In this position the eye plays freely on the thimble, the trace keeping it in position until the horse is detached from the vehicle, and then the eye is turned on the thimble till the slot and the lug correspond in position, when the eye is readily slipped off.

The thimble may extend onto the whiffletree as far as may be desired; but a collar, G, or a similar stop to the eye is necessary.

The slot and the lug, instead of being made square, as seen in the drawing, may be V-shaped, or in any other suitable form.

I am aware of patent No. 70,197, and make no claim to anything therein shown; but What I do claim as new, and of my invention herein, is—

The combination, with thimble F, having lug H on its circumference, and collar G, of the trace-eye B, having slot E, as and for the purpose specified.

JOHN L. WINGATE.

Witnesses:
WILLIAM BARR,
JOSEPH HOWES.